United States Patent [19]
Aida et al.

[11] Patent Number: 5,524,242
[45] Date of Patent: Jun. 4, 1996

[54] SYSTEM AND METHOD FOR DETERMINING THE NUMBER OF PARALLEL PROCESSES TO BE CREATED ACCORDING TO RUN COST VALUE AND PARALLELIZATION OVERHEAD

[75] Inventors: Kazuhiro Aida; Eiji Nunohiro, both of Yokohama; Yoshikazu Tanaka, Ohmiya, all of Japan

[73] Assignee: Hitachi, Ltd., Tokyo, Japan

[21] Appl. No.: 743,031

[22] Filed: Aug. 9, 1991

[30] Foreign Application Priority Data

Aug. 9, 1990 [JP] Japan ................................ 2-212264

[51] Int. Cl.6 ............................ G06F 15/16; G06F 9/40; G06F 9/46
[52] U.S. Cl. .................. 395/650; 395/375; 364/228.9; 364/230.3; 364/262.4; 364/262.7; 364/DIG. 1
[58] Field of Search ................................ 395/700, 650, 395/800, 375; 364/DIG. 1, DIG. 2, 228.7, 228.9, 230.3, 262.4, 262.7

[56] References Cited

U.S. PATENT DOCUMENTS

| | | | |
|---|---|---|---|
| 3,623,007 | 11/1971 | Eckhart et al. | 395/650 |
| 4,414,624 | 11/1983 | Summer, Jr. et al. | 395/650 |
| 4,517,641 | 5/1985 | Pinheiro | 395/840 |
| 4,920,487 | 4/1990 | Baffes | 395/650 |
| 5,021,947 | 6/1991 | Campbell et al. | 395/700 |
| 5,050,070 | 9/1991 | Chastain et al. | 395/375 |
| 5,067,068 | 11/1991 | Iwasawa et al. | 395/650 |
| 5,077,661 | 12/1991 | Jain et al. | 395/375 |
| 5,088,034 | 2/1992 | Ihara et al. | 395/700 |
| 5,151,991 | 9/1992 | Iwasawa et al. | 395/700 |
| 5,404,521 | 4/1995 | Murray | 395/650 |
| 5,471,622 | 11/1995 | Eadline | 395/650 |

OTHER PUBLICATIONS

Saltz et al, "Run–Time Parallelization and Scheduling of Loops," IEEE Transactions on Computers, vol. 40, No. 5, May, 1991, pp. 603–612.

*Primary Examiner*—Thomas G. Black
*Assistant Examiner*—Jack M. Choules
*Attorney, Agent, or Firm*—Antonelli, Terry, Stout & Kraus

[57] ABSTRACT

The system for executing processes in parallel in a multi-processor system having plural instruction processors performs parallel processing by converting a source program written in a high-level language into an object module, creating parallel processes for the processing of the parallel-executable parallelling object segment, and executing the parallel processes on the plural instruction processors. In the object module, a run cost value is set for giving a standard of a run time for the parallel-executable parallelling object segment, and the number of the parallel processes to be created is determined in accordance with the run cost value immediately prior to the execution of the parallel processes. Then, the parallel processes are created in the number determined to be created, and the parallel processing is performed by the execution of the parallel processes.

17 Claims, 8 Drawing Sheets

| CHAIN DATA | ~75 |
| DATA ADDRESS FOR EXECUTION OF PARALLEL EXECUTABLE DO LOOP | ~76 |
| ECB FOR NOTIFICATION OF END OF PARALLEL PROCESSES | ~77 |
| INITIAL VALUE OF LOOP REPEAT COUNT OF PARALLEL PROCESS | ~78 |
| END VALUE OF LOOP REPEAT COUNT OF PARALLEL PROCESS | ~79 |

FIG. 7

```
        SUBROUTINE  SUB (X,Y,Z)
        DIMENTION   X(500),Y(500),
                    Z(500)
        ⋮
        DO 10  I=1, 500
   10   X(I)=Y(I)*Z(I)
        ⋮
        RETURN
        END
```

FIG. 8

SYSTEM AND METHOD FOR DETERMINING THE NUMBER OF PARALLEL PROCESSES TO BE CREATED ACCORDING TO RUN COST VALUE AND PARALLELIZATION OVERHEAD

BACKGROUND OF THE INVENTION

The present invention relates to a system for the parallel execution of processes and, more particularly, to a system for system for parallel execution of processes in a multiprocessor system having plural instruction processors for creating a number of parallel processes so as to minimize the run time and for executing the parallel processes created when a source program written in a high-level language is converted into an object module whereby the created parallel processes are executed in an efficient way.

In a multiprocessor system, a source program written in a high-level language is converted into an object module and the data of the program is processed. In this case, demands have been made to efficiently process the program in a parallel manner by operating plural processors in the system for processing for data of the program.

However, the extent to which parallel operation of the plural processors is performed may vary with the contents of the program or with the contents of the object module which is converted from the source program, so that the process of compiling for converting the source program into the object module is performed by the process of creating a paralleling object segment (parallel process) so as to allow the program processing in each of the processors to be executed in parallel operation to the greatest extent possible. It has further been desired that the process of a processing unit for execution of the object module is created in an optimum number and the control of execution of the parallel processes can be performed in an efficient way.

Heretofore, an algorithm to allocate the parallel processes to the plural processors has been discussed in "Parallel Programming And Compilers, Kluwer Academic Publishers, 1988, pp. 97 to 101. This literature describes run-time task scheduling and loop scheduling as examples of scheduling. The run-time task scheduling is the scheduling process for registering the parallel processes in a queue, allowing an empty processor to fetch the queues in order in a first-in last-out fashion, and executing of the parallel processes, when the paralleling object segment (parallel process) becomes executable in parallel. On the other hand, loop scheduling is a scheduling process for dividing repeats of loops and processing them in parallel when the parallel process (paralleling object segment) is a computation loop (hereinafter referred to as a DO loop) for computing the repeat of the program. This loop scheduling comprises self scheduling in which one time of the processing of the loop repeat is determined as one parallel process, chunk scheduling in which n times (fixed) of the processing of the loop repeats is determined as one parallel process, and guided self scheduling in which one process of the parallel processes is given by a simple formula by having it depend upon the count of the remaining loops. It describes the effect that, from the theoretical analysis of the time required for parallel processing, the guided self scheduling is best when the load. balance of the processors and the divided overhead are taken into consideration.

As described, discussion has been made of the scheduling processes with respect to the loop repeats of each of the parallel executable DO loops in correspondence with the number of the parallel processes to be created when the loop repeats are divided as the parallel processes.

However, the conventional technology as described hereinabove discusses a method of dividing processes into an optimum number of l parallel processes in processing the DO loops by a multiprocessor, however, it is silent about the overhead for processing the parallel processes after the creation of the parallel processes by dividing the loop repeats of the DO loops. Hence, the conventional technology has the problem that performance in execution of the DO loops is worsened when the operation of the DO loops is executed by parallel processing in instances where the operation quantity of the DO loops to be converted into the parallel processes would be smaller than the overhead for parallel processing.

SUMMARY OF THE INVENTION

The object of the present invention is to provide a system and method for the parallel execution of processes, which involves creating the parallel processes in number so as to minimize the run time when a source program written in a high-level language is converted into an object module and executed in a multiprocessor system having a plurality of instruction processors, and executing the parallel programs in an efficient way.

In order to achieve the foregoing object, the present invention consists of a system and method for the parallel execution of processes in a multiprocessor system having plural instruction processors for performing the parallel processing of the parallel-executable object segment by converting a source program described in a high-level language into an object module, creating parallel processes, and executing the parallel processes on the plural instruction processors. The method comprises the steps of setting a run cost value which gives a standard for a run time of the parallel-executable object segment in the object module; determining the number of parallel processes to be created in accordance with the run cost value immediately before the execution of the parallel processes; creating the determined number of parallel processes: and executing the parallel processes. The number of parallel processes to be created immediately prior to the execution of the parallel processes is determined by determining the maximum number of parallel processes to be created on the basis of the run cost value and counting repetitions of each of the loops for computing repeats of the program.

In executing the program by converting the source program written in the high-level language into the object module in the multiprocessor with the plural processors, the parallel-executable object segment is processed in parallel by creating the parallel processes and executing the parallel processes on the plural instruction processors. When the source program is to be converted into the object module, the run cost value is set in the object module, which provides the object module with a standard of the run time for the executable parallelling object segment. During the execution of the object module, a serial process object instruction sequence is executed, the number of the parallel processes to be created is determined in accordance with the run cost value immediately prior to the execution of the parallel process object, the determined number of parallel processes are created, and the created parallel processes are executed.

In this case, the number of the parallel processes to be created is determined immediately prior to the execution of the parallel processes from the count of repetitions of each loop of the DO loops for computing the repetition of the program by determining the maximum number of the creatable parallel processes on the basis of the run cost value.

Hence, for example, the number of the parallel processes for processing the parallel processes in a minimum run time, including the time required by the overhead relating to the execution of the parallel processes, can be determined on the basis of the run cost value determined by the operation quantity of the DO loops in executing the parallel executable DO loops. As described hereinabove, the system according to the present invention allows efficient parallel execution for the executable DO loops without causing any decrease in performance due to the overhead pursuant to the parallel execution by determining the optimum number of the parallel processes to be created and performing the the parallel processes.

DESCRIPTION OF THE PREFERRED EMBODIMENTS

Description will first be made of the fundamental configuration for performing the process parallel-executing system according to an embodiment of the present invention. The process parallel-executing system in which the optimum number of parallel processes to be created is determined and parallel processing of the created parallel processes is carried out on the multiprocessor and is specifically performed by sharing the processing of a compiler, the configuration of an object module generated by the compiler, and the processing of a parallel run time library for controlling the execution of the parallel processes, and by providing a process register library.

A. Processing of Compiler

In the processing of the compiler for converting a source program written in a high-level language, for example, the operation quantity of parallel executable DO loops is computed on the basis of the repeat count of the DO loops and the resulting operation quantity gives a run cost value of the parallel processes. When the DO loop has a variable that does not function as a constant during compiling in computing the operation quantity, the computing formula itself is created in the object module and an intermediate code is created for giving a store instruction in a run cost field for storing the run cost value computed by the computing formula of the operation quantity using a value of an established variable.

When the computing value of the operation quantity becomes a constant at the time of compiling or when the run cost value is specified in the source program, the specified value is set in the run cost field as the run cost value.

B. Configuration of Object Module

In the configuration of the object module for converting the source program written in the high-level language and for creating the object module by the processing of the compiler, the run cost field for storing the run cost value is provided in order to give the run cost value as execution information to the parallel run time library for controlling the execution of the parallel processes. The run cost value stored in the run cost field serves as interface information to be given from the object module to the parallel run time library and gives a standard for a run time of each of the parallel executable DO loops.

C. Processing of Parallel Run Time Library

In the parallel run time library for controlling the execution of the parallel processes is provided a process information table for managing each of the parallel processes. In the process information table, there may be set an object address for specifying an object instruction sequence of the parallel processes existing in the object module, an execution information address for specifying the execution information of the parallel executable DO loop, including the run cost field, an initial value of repeats of the parallel processes, and an end value of the repeats of the parallel processes. The scheduling of the parallel processes is performed by registering this process information table in a queue and fetching it from the queue.

D. Process Register Library

In processing the parallel run time library, a process register library for carrying out the processes which follow, in the register in the queue, is provided by setting a series of the parallel executable DO loops as parallel processes.

The number of the parallel processes to be created is determined by the run cost value of the parallel executable DO loops, and the initial and end values of the repeats of the parallel processes to be created are set in the process register table.

Then, description will be made of an outline of a sequence of the processes for parallel processing a program by creating the parallel processes and processing the parallel processes by the processing of the compiler and the processing of the parallel run time library.

When the run cost value of the parallel executable DO loop is specified in the source program, on the one hand, the compiler sets the specified value in the corresponding run cost field of the DO loop within the object module. When no run cost value is specified, on the other hand, the operation quantity of the executable DO loop is computed on the basis of the loop repeat count. When the resulting value is established, the value is set in the corresponding run cost field within the object module. When the loop repeat count is not established, a code for storing the computing result obtained by computing the operation quantity during the execution of the processes is generated into the run cost field within the object module. These operations allow the number proportional to the run time of each parallel executable DO loop to be set as the run cost value in the run cost field of an execution information area of the parallel executable DO loop within the object module, immediately prior to the execution of the parallel executable DO loop in the execution control of the parallel processes of the parallel run time library. In executing the parallel executable DO loop of the object module, the parallel run time library is registered in the queue by determining the number of parallel processes to be created from the run cost of the loop, the minimum cost for parallel execution, the maximum number of parallel processes to be created, and the loop repeat count, to set the initial and end values of repeats of the loops of each parallel process to be created in the process information table.

This arrangement allows the parallel execution of each of the parallel executable DO loops to be made at an improved run speed without causing any decrease in performance due to the parallel execution because the optimum number of parallel processes is created in performing the parallel execution and the initial and end values of repeats of the loops of each process are determined from the number of the parallel processes created.

Figure 1:
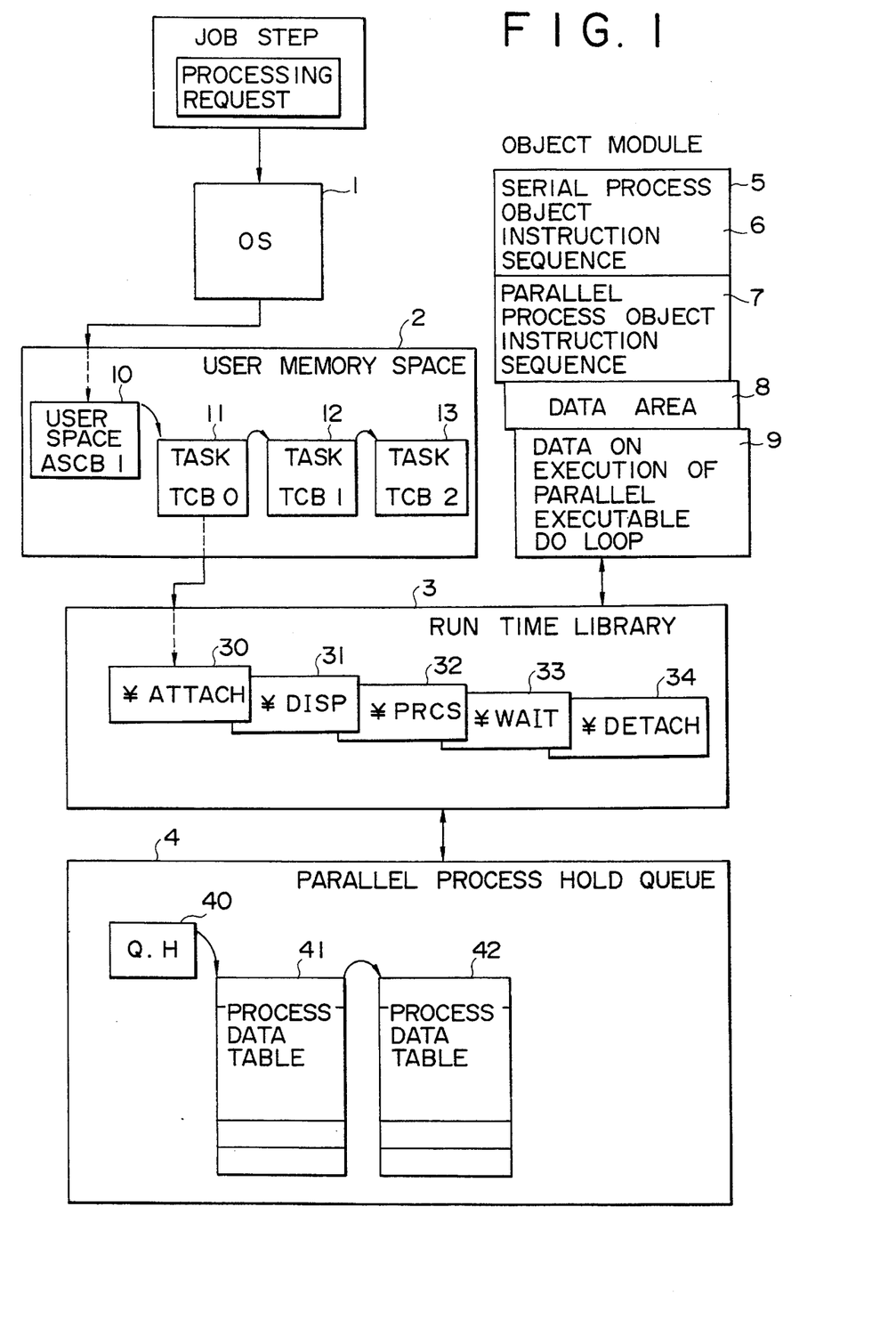
FIG. 1 is a block diagram showing an overall configuration of elements for parallel processing in the system of parallel executing processes according to an embodiment of the present invention.

FIG. 1 is a block diagram for describing an overall configuration of the elements for the parallel processing by the process parallel-executing system according to an embodiment of the present invention. As shown in FIG. 1, reference numeral 5 stands for an object module which in turn is program data comprising a program of a machine language code converted and created in accordance with the contents of the source program written in advance in the high-level language by the compiler, and execution information with respect to the execution control. In the object module 5, are a serial process object instruction sequence 6 and a parallel process object instruction sequence 7 in accordance with the contents of the source program. Further, a data area 8 and execution data 9 for the parallel executable DO loops are created therein.

An operating system (OS) 1 creates a user space (ASCB1) 10 for a user in a user memory space 2 when a processing request called a job step is received from the user, followed by creating a first task (TCB0) 11 in the user space 10 and allowing the object module 5 to start executing by the first task (TCB0).

Once the execution of the object module 5 starts, the first task (TCB0) 11 first calls a ¥ATTACH library 30 from the run time library 3 by a PARAM operand of a EXEC statement of a job control language (JCL) at the top of the prologue processing at the start-up portion of a main program. The ¥ATTACH library 30 creates the number of subtasks specified by the user. In this embodiment, for example, a second task (TCB1) 12 and a third task (TCB2) 13 are created as subtasks. The subtasks, i.e. the second task (TCB1) 12 and the third task (TCB2) 13, fetch a first process information table 41 specified by a queue header 40 from a parallel process hold queue 4, thereby starting a ¥PRCS library 32 of the run time library 3 and executing the parallel processes with respect to the first process information table 41. The process information table 41 (FIG. 6) is a table for storing execution control information on a process, as will be described more in detail hereinafter, and it stores, for example, such execution information as the initial and end values of loop repeats of the parallel processes for controlling the parallel processes.

As the execution of the object module 5 advances and it reaches immediately prior to the parallel executable DO loop, a ¥DISP library 31 is called from the run time library 3. The ¥DISP library 31 creates a new process information library 42 for the parallel executable DO loop, determines the number of the parallel processes to be created on the basis of the run cost value of the execution information of the parallel executable DO loop of the parallel process object module 5 set as execution information, and sets the initial and end values of repeats of the loop for each of the parallel processes in the process information table 42. The data is then registered in the parallel process register queue 4 in a batch mode when the ¥DISP library is called in a final processing step during execution of a series of the parallel executable DO loops.

The run cost value is set as execution information for performing the control over the execution of the parallel executable DO loops by the compiler at the time when the object module 5 has been created. And the run cost value is computed by processing a computing formula for computing an operation quantity set in the object module 5 and set in a position of the run cost field for storing the run cost value, prior to a call of the ¥DISP library, when it is not yet set due to the fact that a variable is not yet established during compiling, etc. because the run cost value is required to be set merely prior to the call of the ¥DISP library.

The execution of the parallel process hold queue 4 is performed by a ¥PRCS library 32 of the parallel run time library 3 in the order of the parallel processes created for a series of the parallel executable DO loops. This execution is performed by making the ¥PRCS library 32 to allocate the parallel processes to the tasks and allowing a physical processing unit (an instruction processor) to process each of the parallel processes, followed by calling a ¥WAIT library 33 of the run time library 3 and waiting for the end of a series of parallel executable DO loops. Then, in order to erase the subtasks created during the epilogue processing at an end portion of the main program, a ¥DETACH library 34 is called from the run time library 3, thereby ending the processing of a series of the programs.

Figure 2:
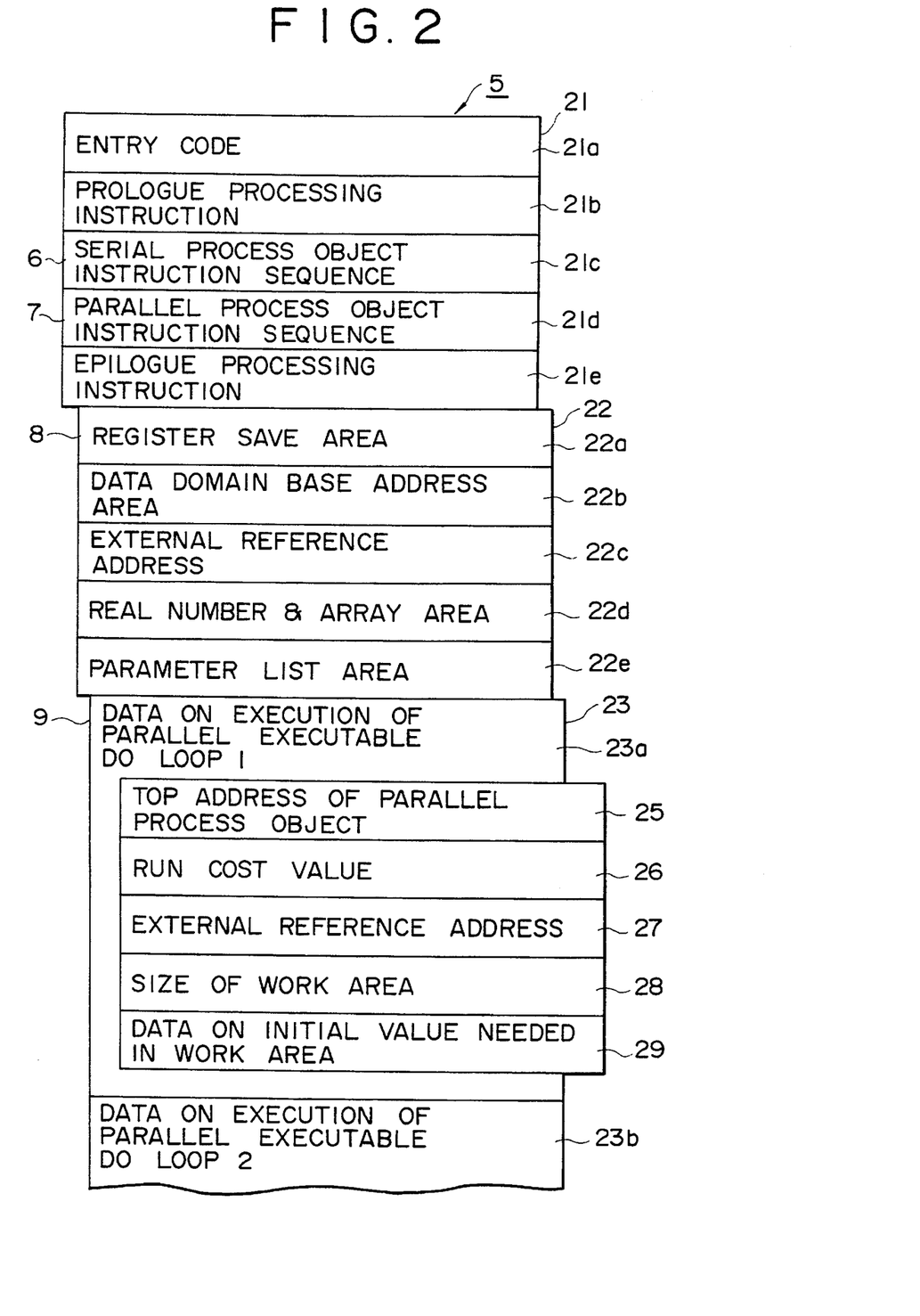
FIG. 2 is a diagram showing details of the configuration of the object module according to an embodiment of the present invention.

FIG. 2 is a diagram showing details of the configuration of the object module according to an embodiment of the present invention. As shown in FIG. 2, the object module 5 comprises an instruction language area 21, a data area 22, and an execution information area 23. The instruction language area 21 is divided into an entry code area 21a, a PROLOG processing instruction area 21b, a serial process object instruction sequence area 21c, a parallel process object instruction sequence area 21d, and an epilogue processing instruction area 21e, each of these areas storing a machine language instruction for each process. The data area 22 comprises a register save area 22a, a data domain base address area 22b, an external reference address area 22c, a real number & array area 22d, and a parameter list area 22e. In the execution information area 23 for storing the execution control information, execution information is stored so as to correspond to the parallel processes, such as execution information 23a on parallel executable DO loop 1, execution information 23b on parallel executable DO loop 2, etc. For example, the execution information 23a on the parallel executable DO loop 1 is provided with fields for storing data, such as a top address 25 of the parallel process object of the execution information of the parallel executable DO loop corresponding to the process, a run cost value 26, an external reference address 27, a work area size 28, initial value information 29 needed in the work area, etc. and each of the execution information is stored in the field in order to allow one parallel process to be created and to execute the processing. Although not shown herein, execution information 23b on the next executable DO loop 2 is likewise provided with fields for storing data, such as the top address 25 of the parallel process object of the execution information of the parallel executable DO loop corresponding to the process, the run cost value 26, the external reference address 27, the work area size 28, the initial value information 29 needed in the work area, etc. in order to create one parallel process and execute the processing. Each of the execution information is stored in the field. This can be applied to execution information on other parallel executable DO loops in the same manner as described hereinabove.

In the field for storing the parallel process object top address 25, there is stored data indicative of a top address of the corresponding parallel process object instruction sequence 6 within the object program instruction. The run cost field for storing the run cost value 26 stores a run cost value indicative of a value assuming a load of the parallel executable DO loop. In the field for storing the external reference address 27, there is address data for holding an entrance address for each when an external procedure, an external function, etc., exist in the parallel executable DO loop. In the field for storing the work area size 28, there is stored data indicative of a size of the work area necessary for a temporary variable, a variable and array necessary for the parallel execution in the parallel executable DO loops. Further, the field for storing the initial value information 29 needed in the work area stores data indicative of a base address value of the work area if the size exceeds one page register of the work area necessary for the parallel executable DO loop.

Figure 3:
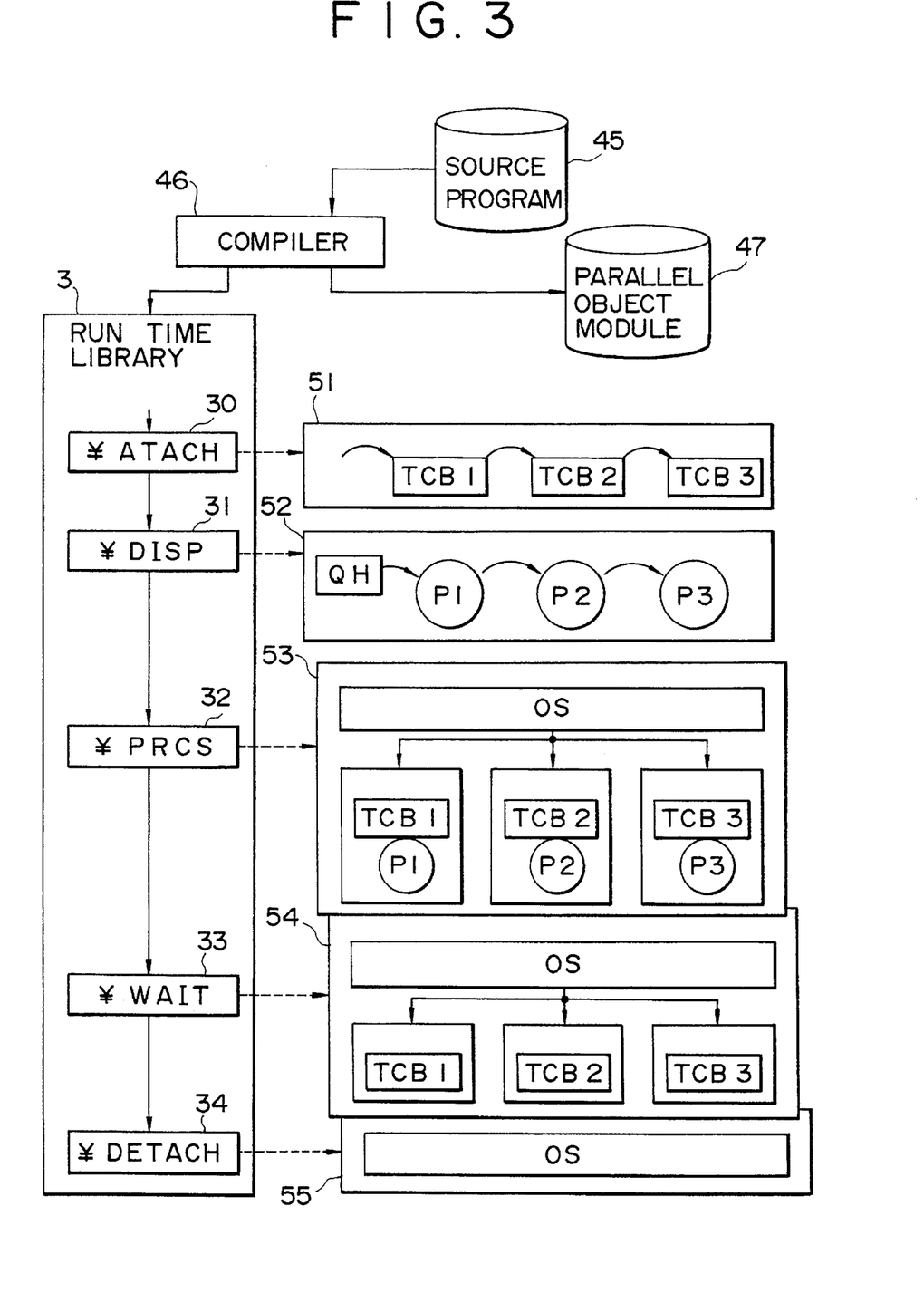
FIG. 3 is a block diagram for describing a sequence of processes by the process parallel-executing system according to an embodiment of the present invention.

FIG. 3 is a block diagram for describing the sequence of the processes by the process parallel-executing system according to an embodiment of the present invention. First, a compiler 46 is started, followed by reading a source program 45 written in the high-level language from a file, executing the compiling processing for conversion into a machine language instruction sequence for the source program 45 and outputting into the file as the object module. The object module contains execution information of the source program 45 and a parallel processible portion of the source program is converted into a parallel object module 47 in order to create and process parallel processes. The parallel object module 47 to be converted herein has the run cost value set in the run cost field of the execution information of the parallel processes.

For the DO loop which has created the parallel processes and is made executable in parallel, for example, when the range of the variable of the DO loop is fixed and a specification of the run cost value exists in the source program, the specified value is set in the corresponding run cost field of the DO loop. For example, when the range of the variable of the DO loop is not fixed and the run cost value is not specified in the source program due to multiple DO loops or for other reasons, the operation quantity of the DO loops is computed on the basis of the loop repeat count, weight, etc., and the resulting value of the operation quantity is set in the corresponding run cost field within the object module when the value of the operation quantity is established. On the other hand, if the operation quantity such as the loop repeat count, etc. is not established during the compiling processing to be performed herein, i.e. for example, if the range of the variable of the DO loop is determined by the contents of the immediately previous processing, the operation quantity is computed immediately prior to the execution of the parallel processes and a code for storing the computing result in the run cost field in the object module is generated in the object module at the time of the compiling processing.

When the processing of the compiler 46 in the manner as described hereinabove has been finished, the parallel executable portion of the source program 45 creates the parallel object module 47, including the execution information, in the object module. As the object module has been created, the control of the processing is shifted to the control over the execution of the object module. In executing the processing, first, a task is created for controlling the execution of the object module, and the task calls a run time library 3 by a PARAM operand of the EXEC statement of the job control language at the top of the prologue processing of the start section of the main program, thereby shifting the processing control to a ¥ATTACH library 30. The processing of the ¥ATTACH library 30 creates subtasks necessary for the parallel execution. The number of the subtasks to be created herein is the number required for processing the plural parallel processes and the subtasks are created in the number specified by the user. As shown in a processing box 51, for example, a second task (TCB1), a third task (TCB2), and a fourth task (TCB3) are created, which follow the parent task (TCB0).

Then, the control of the processing is shifted to a ¥DISP library 31. In the processing of the ¥DISP library 31, the run cost value is fetched from the run cost field of the execution information of the parallel process processing, the number of the parallel processes to be created from the run cost value is determined using the run cost value as a total operation quantity of the parallel executable portion, and the resulting number of the parallel processes is created and registered by computing the initial and end values of the loop repeats of each parallel process and setting the value of the process information table for each value. As shown in a processing box 52, each of the parallel processes created is registered as process information tables P1, P2 and P3, respectively, in which the execution control information of the parallel process is set. The process information tables P1, P2 and P3 are linked in order to the queue header QH of the parallel process hold queue and are registered.

The processing control is then shifted to a ¥PRCS library 32. In the processing of the ¥PRCS library 32, the parallel processes (P1, P2 and P3) are fetched from the parallel process hold queue and allocated to each of the tasks (subtasks TCB1, TCB2 and TCB3, respectively) which have been created in plurality and which are operated by a system control program (an operating system), thereby executing each of the parallel processes by a physical processing unit (an instruction processor).

Turning now to a ¥WAIT library 33, the end of the processing of each of the parallel processes (P1, P2 and P3) is awaited, thereby finishing the processing of the parallel processes (P1, P2 and P3) in each task as shown in a processing box 54, and finishing a series of the processes of the parallel processible DO loop by performing the parallel processing of the plural parallel processes.

Then, the processing control is shifted to a ¥DETACH library 33 and the plural subtasks created are deleted by the epilogue processing at the end portion of the main program, thereby finishing a series of program processing, as shown in the processing box 55.

Figure 4:
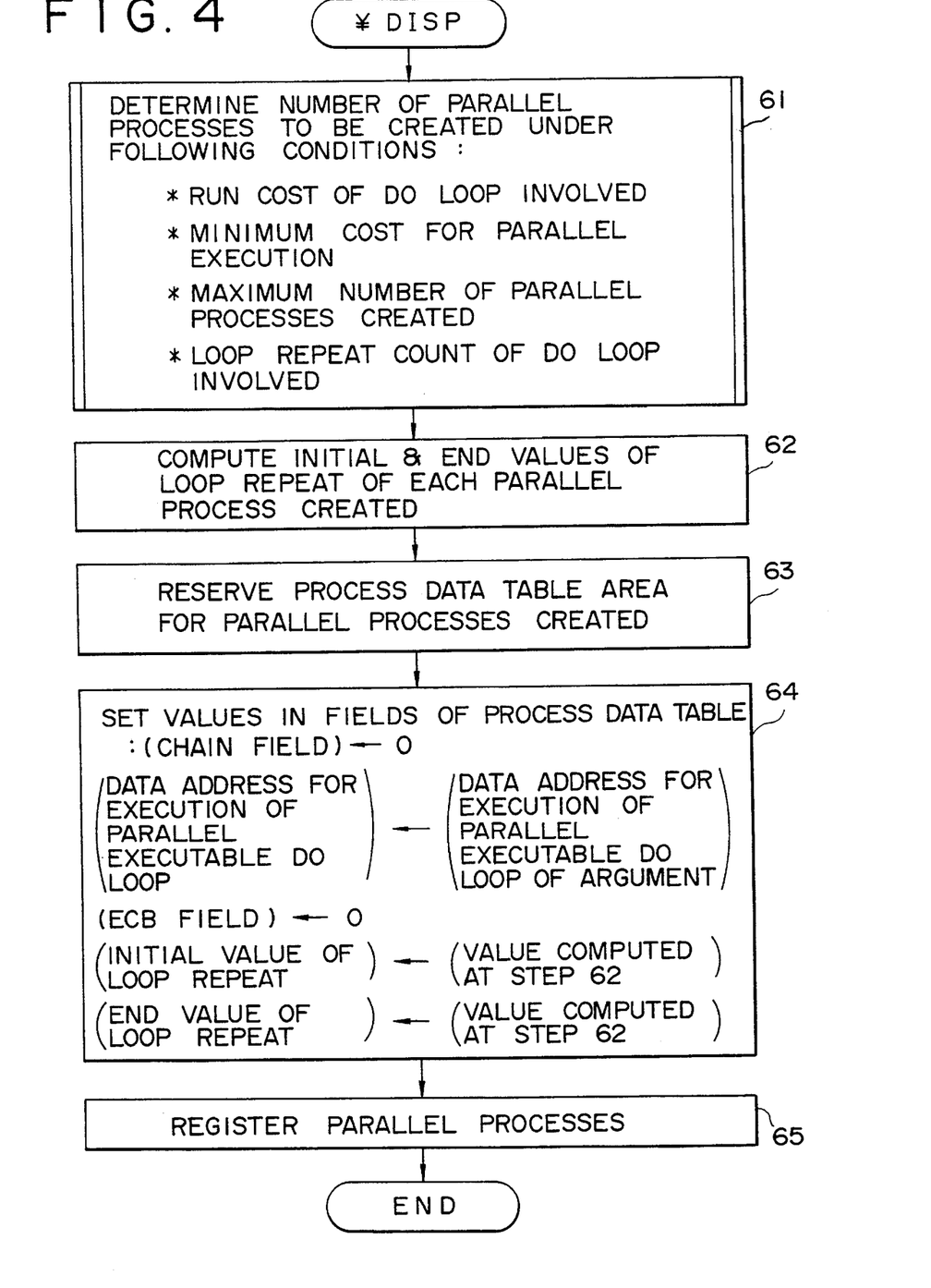
FIG. 4 is a flow chart showing the processing of a ¥DISP library.

FIG. 4 is a flow chart indicating the processing of the ¥DISP library. In the execution control of the parallel processes by the run time library, a number proportional to the run time of each of the parallel executable DO loops is set as a run cost value in the run cost field of the execution information area of the DO loop within the object module, immediately before the execution of the parallel object module of the parallel executable DO loops by the ¥DISP library.

The processing of the ¥DISP library will be described with reference to FIG. 4. First, at step 61, the number of the parallel processes to be created is determined on the basis of the run cost value of the parallel executable DO loops, the minimum cost for parallel execution inherent in the system, the maximum number of the parallel processes to be created, and the repeat count of the DO loops. Then, at step 62, the initial and end values of the loop repeats of each of the parallel processes created are computed so as to make the run cost value equal to each other.

Then, at step 63, a process information table area is secured to comply with the number of the parallel processes to be created, followed by step 64 at which the processing is performed for setting a value in each field of the process information table. In other words, a chain field is set to "0" for chaining the process information tables and, in the chain field of the next process information table, there is set an address in which an address is added so as to agree with the process information table area. In order to hold the execution information necessary when the parallel processes are executed, an execution address of the parallel executable DO loop of output argument is set in the execution information address of the parallel executable DO loop. An ECB (Event Control Block) field is a communication area for signalling the end of the parallel processes and it is set to "0" as an initial value. As the initial and end values of repeats of the loops of the parallel processes, the initial and end values computed by the processing at step 62 are set.

Then, at step 65, the top address of the process information table for the parallel processes is set in the queue header of the parallel process hold queue, thereby processing the register of the parallel processes and finishing a series of the processing of the ¥DISP library.

As described hereinabove, there are prepared the process information tables in which the execution information is set for each of the parallel processes. The optimum number of parallel processes to be determined by the run cost value is created by registering the process information tables in order to the parallel process hold queue, thereby finishing a series of processes for registering the parallel processes created.

It is noted herein that the optimum number of parallel processes to be determined by the run cost value is determined at step 61 by computing the number of the parallel processes to be created from each data of the run cost value of the parallel executable DO loop, the minimum cost for parallel execution inherent in the system, the maximum number of the parallel processes to be created, and the count of repeats of the DO loops.

Figures 5, 5A:
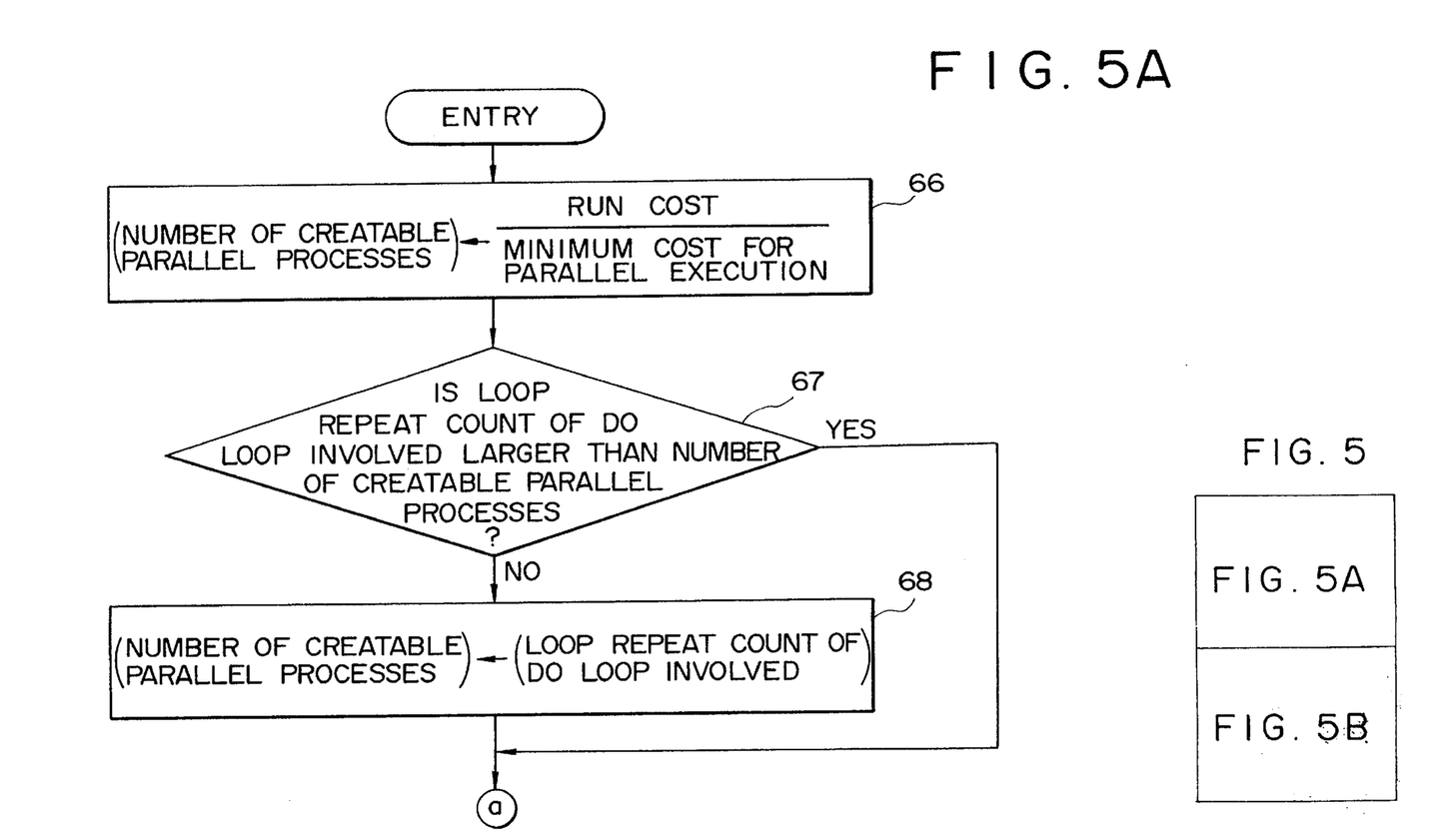
FIG. 5A and 5B are a flow chart showing the processing flow for computing the number of the parallel processes to be created.
Figure 5B:
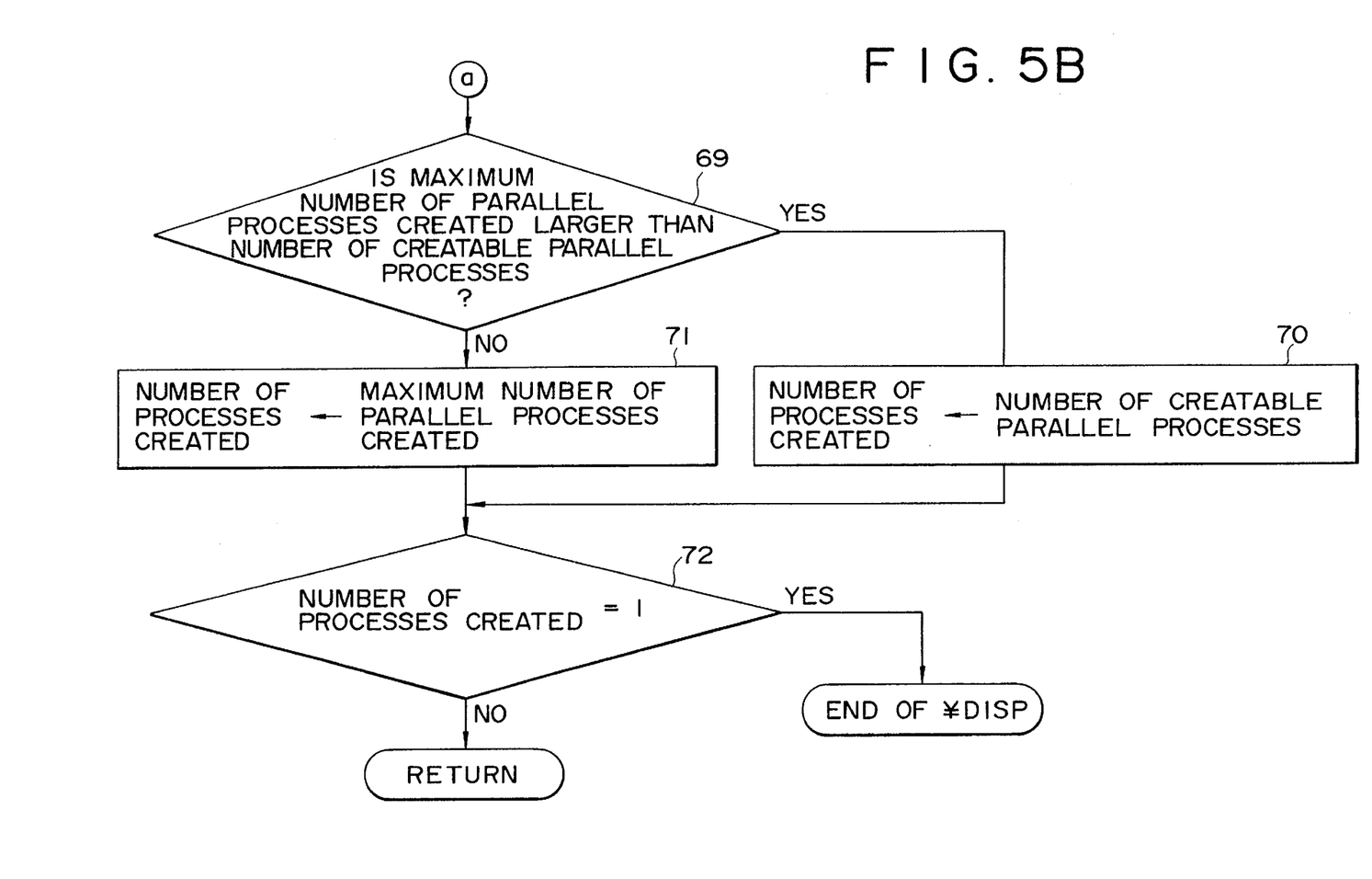

FIG. 5 is a flow chart for computing the number of parallel processes to be created. In order to compute the number of parallel processes to be created for processing the parallel executable DO loops, the number of creatable parallel processes is computed at step 66 by dividing the run cost value stored in the run cost field of the execution information of the DO loops with the parallel execution minimum cost inherent in the system. Then, at step 67, a decision is made to determine if the loop repeat count of the DO loops is larger than the computed number of the creatable parallel processes. When the result of decision at step 67 indicates that the loop repeat count is larger than the computed number of the creatable parallel processes, then the program flow goes to step 69. On the other hand, when it is decided at step 67 that the loop repeat count is equal to or smaller than the computed number of creatable parallel processes, then the program flow goes to step 68 at which the number of the creatable parallel processes is changed to the loop repeat count, followed by proceeding to step 69.

Then, at step 69, a decision is further made to determine if the maximum number of the parallel processes created is larger than the number of the creatable parallel processes. When it is decided at step 69 that the maximum number thereof is larger than the number of creatable parallel processes, on the one hand, then the program flow goes to step 70 at which the number of parallel processes created is determined as the number of creatable parallel processes. When the result of decision at step 69 indicates that the maximum number of parallel processes created is equal to or smaller than the number of creatable parallel processes, on the other hand, the program flow goes to step 71 at which the number of parallel processes created is determined as the maximum number of parallel processes created.

After steps 70 and 71, then the program flow goes to step 72 at which a decision is made to determine if the number of created parallel processes determined by the processing as described hereinabove is "1". When the result of decision at step 72 indicates that the number of created parallel processes is "1", on the one hand, the processing of the ¥DISP library is finished in order to allow the processing of a serial process object, because the processing of the DO loops by the parallel process processing makes an overhead for the parallel process processing too large. When the number of created parallel processes is not "1" yet a plural number, on the other hand, then the program flow returns to step 62 for processing the ¥DISP library because the parallel executable DO loops can be efficiently processed by the parallel processes.

This processing can determine the optimum number of parallel processes for performing the parallel processing of the parallel executable DO loops. Given the optimum number of parallel processes, the loop repeat initial and end values for each process are determined from the number of parallel processes and the parallel processes are created. Hence, this processing can improve the run speed of the parallel executable DO loops without causing any decrease in performance due to the parallel execution.

Figure 6:
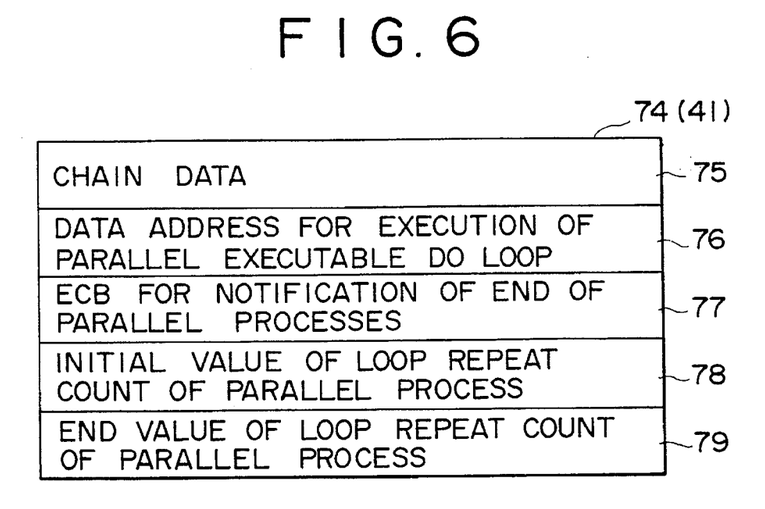
FIG. 6 is a diagram showing an example of the configuration of a process information table of a parallel process.

FIG. 6 is a diagram showing an example of the configuration of the process information table of the parallel process. The process information table comprises a chain data field 75, an execution information address field 76 for the parallel executable DO loop, an ECB field 77 for notifying of the end of the parallel processes, an initial value field 78 for the loop repeat initial value of the parallel processes, and an end value field 79 for the loop repeat end value thereof. For example, the chain data field 75 is a field for chain data for chaining plural process information tables and sets an address of the process information table to be chained next. The execution information address field 76 sets an execution address of the parallel executable DO loops of input argument in order to hold the execution information necessary when the execution of the parallel processes is controlled. The ECB field 77 is a communication field for notifying of the end of the parallel processes. The initial value field 78 sets the loop repeat initial value of the parallel processes. The end value field 79 sets the loop repeat end value of the parallel processes.

The plural process information tables of the parallel processes are chained from the queue header of the parallel process hold queue, thereby creating the plural parallel processes.

Figure 7:
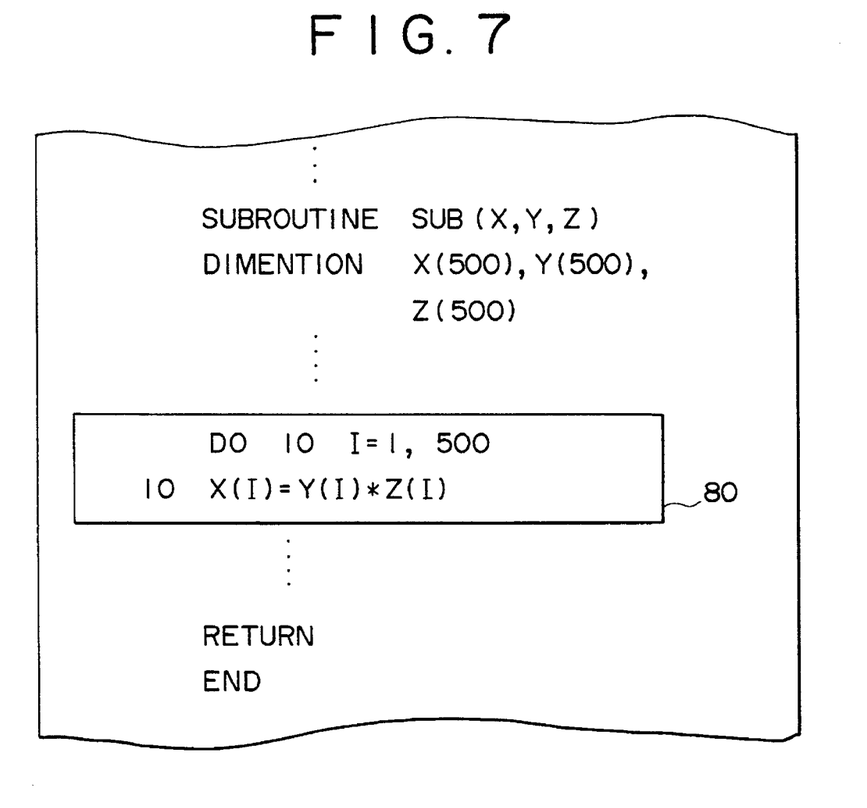
FIG. 7 is a diagram showing an example of a FORTRAN program for describing the processing example.

Then, description will be made of the specific way of processing the DO loops of a FORTRAN program as an example of processing the parallel processes. FIG. 7 is a diagram showing an example of the FORTRAN program for describing the way of processing the parallel processes, and FIG. 8 is a diagram showing the configuration of the parallel object module, which describe the DO loop portion of the FORTRAN program of FIG. 7 in a FORTRAN-like manner to such an extent that the operation of the portion with respect to the parallel control is understandable.

Figure 8:
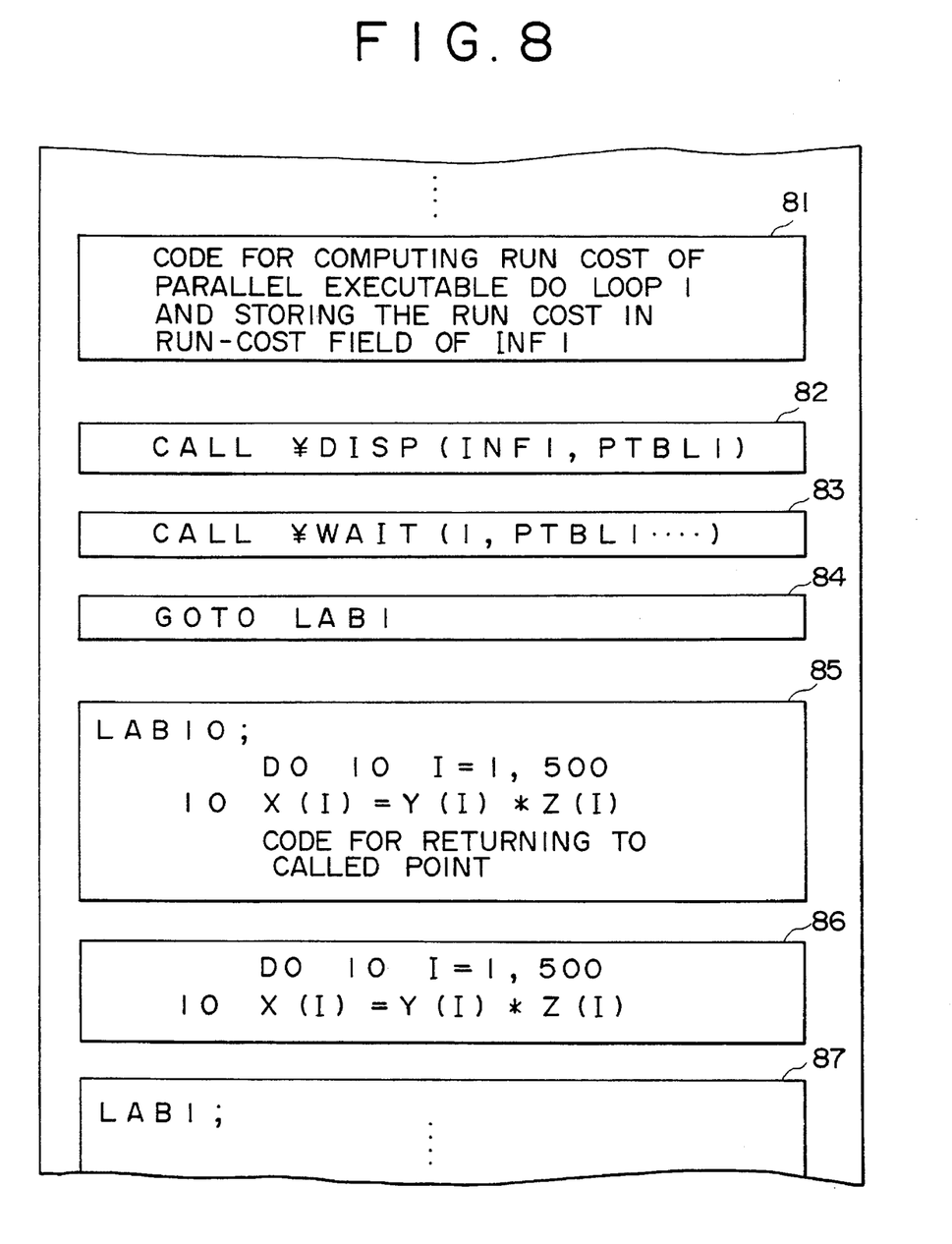
FIG. 8 is a diagram showing the configuration of the parallel object module in which the DO loop segment of the FORTRAN program of FIG. 7 is described in a FORTRAN-like manner for an operation of the portion relating to the parallel control to be understood.

In the FORTRAN program of FIG. 7, a program section 80 of the DO loop is a program portion which is processible in parallel, and a compiler creates a parallel object module as shown in FIG. 8 in order to create the parallel processes and subject the program section 80 to parallel processing.

In the parallel object module, there is created, as a first code 81, "CODE FOR COMPUTING RUN COST OF PARALLEL PROCESS AND STORE THE RUN COST IN RUN COST FIELD (26: FIG. 2) OF INF1 (an execution information area of the parallel executable DO loop 1 within the object module)", followed by a second code 82, "CALL ¥DISP(INF1, PTBL1)". In the processing of the second code 82, the ¥DISP library (31: FIGS. 3 and 4) is called for creating and registering the parallel processes from the run time library, thereby transferring the processing to the ¥DISP library. The first argument (INF1) of the ¥DISP library called at the second code 82 is an address of the execution information area of the parallel executable DO loop, while the second argument (PTBL1) is an address of the process information table (41: FIGS. 1 and 6) of the parallel process to be created by the processing of the ¥DISP library. Further, as a third code 83, there is created a code "CALL ¥WAIT(1, PTBL1, . . . )". In the processing of the third code 83, the ¥WAIT library (33: FIG. 3) is called for the processing of awaiting the completion of the parallel processes of the run time library. The first argument (1) of the ¥WAIT library called herein is the number of the executable DO loops, while the second argument (PTBL1) and thereafter are addresses of the process information tables of the created parallel processes.

Then, as a fourth code 84 which follows, a code "GOTO LAB1" is created, thereby branching off to a label LAB1. This is due to a branch into a seventh code 87 because no execution is made of a fifth code 85 which follows, which is an object code of the parallel executable DO loop:

"LAB10;
DO 10 I = 1,500

10 X(I) = y(I)*Z(I)

CODE RETURNING TO CALLED POINT (¥10PRCS)"

and a sixth code 86 which further follows, which is an object code of the serially executing DO loop:

"   DO 10    I = 1,500

10 X(I) = Y(I)*Z(I)".

The processing of the object module is carried out by the main task (TCB0) and finished by processing the first code 81, the second code 82, the third code 83, the fourth code 84 and the seventh code 87. The processing of the main task creates and registers the are parallel processes, and the parallel processes parallel executed by the processing of the subtasks.

The processing of the parallel processes is executed after the processing has been shifted to the ¥PRCS library (32: FIG. 3), and the object code of the parallel executable DO loop as the fifth code 85 is parallel processed by the parallel processes which have been called from the ¥PRCS library and created. The processing of the ¥PRCS library is the processing of the parallel processes under the subtasks created at the top of the program so as to comply with the number specified by the user.

When the number of the parallel processes created and registered in the processing of the ¥DISP library of the second code 82 (step 72: FIG. 5) is determined as one, the processing of the ¥DISP library has been finished immediately, followed by executing the processing of the object code of the serially executing DO loop as the sixth code. In this case, the processing of the serial process object allows the processing of the DO loops with high efficiency yet without causing any overhead due to the parallel process processing.

As described hereinabove, the present invention allows the number of the parallel processes to be created without causing any decrease in performance due to the overhead of the parallel process processing pursuant to the parallel execution and it permits the processing of the parallel executable DO loops to be executed in parallel in an efficient way, when the processing of the parallel executable DO loops is to be executed by the parallel process processing, because the number of the parallel processes to be created can be determined on the basis of the run cost value relating to the operation quantity of the DO loops.

What is claimed is:

1. A method for parallel execution of processes in a multiprocessor system having a plurality of instruction processors for converting a source program written in a high-level language into an object module and for processing a parallel-executable object segment in parallel by creating and executing parallel processes on the plurality of instruction processors, said method comprising the steps of:

setting a run cost value for providing the object module with a basis for a serial run time for the parallel-executable object segment in the object module;

determining the number of parallel processes to be created from the object segment by dividing the run cost value by an overhead value for executing parallel processing rather than serial processing of the object segment;

creating the determined number of parallel processes from the object segment;

registering the created parallel processes in a queue;

fetching the created parallel processes from the queue and assigning the parallel processes to ones of said plurality of instruction processors; and executing the parallel processes using the plurality of instruction processors in accordance with the overhead value corresponding to the parallel processing except when the run cost value is substantially equal to the overhead value and serial processes are, therefore, executed.

2. A method as claimed in claim 1, wherein the number of the parallel processes to be created from the object segment is replaced by a number of repetitions of a computation loop for computing the repetitions of the source program when the number of repetitions is smaller than the determined number of parallel processes.

3. A method as claimed in claim 1, wherein a run time for the parallel-executable object segment specified in the source program is used to determine the run cost value when the source program written in the high-level language is converted into the object module.

4. A method as claimed in claim 1, wherein the run cost value, which is a value proportional to a quantity of processor operations required to execute the object segment, to be set in the object module is set in a run cost field disposed in an execution information area for executing a parallel process object instruction sequence.

5. A method as claimed in claim 4 wherein converting the source program written in the high-level language into the object module includes determining whether or not the run time for the parallel-executable object segment is specified in the source program, and when the run time for the parallel-executable object segment is determined to not be specified in the source program when the source program written in the high-level language is converted into the object module, an operation quantity of a parallel process segment of the object segment is computed from a count of intermediate words of a parallel process object instruction sequence of the object segment and a count of repetitions for each computation loop for repetitive computation in the source program and the operation quantity is set as the run cost value in the run cost field.

6. A method as claimed in claim 5, wherein when the operation quantity of the parallel process segment is not established during conversion of the source program written in the high-level language into the object module, an intermediate code representing a processing for computing the operation quantity of a parallel process from the count of the intermediate words of the parallel process object instruction sequence and the count of repetitions for each computation loop for the repetitive computation in the source program to store the computed operation quantity as the run cost value in the run cost field is created in the object module.

7. A method as claimed in claim 6, wherein when the number of the parallel processes to be created by a determination of the number of the parallel processes to be created from the object segment is determined to be one, processing of a serial object is continued and the parallel process object instruction sequence is processed by the processing of the serial object.

8. A method for creating parallel-executable processes on a program segment forming a computation loop wherein each of the parallel-executable processes is executed by one of a plurality of instruction processors, said method comprising the steps of:

setting a run cost value which is a value proportional to a quantity of processor operations required to execute the entirety of the program segment;

determining a number of parallel processes to be created for the program segment by dividing the run cost value by an overhead value for executing parallel processing rather than serial processing of the program segment;

creating the parallel-executable processes for the program segment, in accordance with the number of determined parallel processes; and registering the created parallel processes in a queue;

fetching the created parallel processes from the queue and assigning the parallel processes to ones of said plurality of instruction processors;

executing the parallel processes using the plurality of instruction processors in accordance with the overhead value corresponding to the parallel processing except when the run cost value is substantially equal to the overhead value and serial processes are, therefore, executed.

9. A method as claimed in claim 8, wherein the number of parallel processes to be created is determined immediately prior to the execution of the parallel processes.

10. A method as claimed in claim 8, wherein when a run time for the parallel-executable program segment is specified in a source program when the source program written in high-level language is converted into an object module, the run time is determined to be equivalent to the run cost value.

11. A method as claimed in claim 8, wherein the run cost value to be set is set in a run cost field disposed in an execution information area for executing a parallel process object instruction sequence.

12. A method as claimed in claim 11, wherein converting the source program written in a high-level language into a object module includes determining whether or not a run time for a parallel-executable object segment is specified in a source program, and when the run time for the parallel-executable object segment is determined to not be specified in the source program when the source program written in high-level language is converted into the object module, an operation quantity of a parallel processing segment of the object segment is computed from a count of intermediate words of a parallel process object instruction sequence of the object segment and a count of repetition for each computation loop for repetitive computation in the source program and the operation quantity is set as the run cost value in the run cost field.

13. A method as claimed in claim 12, wherein when the operation quantity of the parallel process segment is not established during conversion of the source written in the high-level language into the object module, an intermediate code representing a processing for computing the operation quantity of a parallel process from the count of the intermediate words of the parallel process object instruction sequence and the count of repetitions for each computation loop for the repetitive computation in the source program to store the computed operation quantity as the run cost value in the run cost field is created the object module.

14. A method as claimed in claim 13, wherein when the number of parallel processes to be created from the object segment is determined to be one, processing of a serial object is continued and the parallel process object instruction sequence is processed by the processing of the serial object.

15. A system for creating parallel-executable processes on a program segment forming a computation loop wherein each of the parallel-executable processes is executed by one of a plurality of instruction processors comprising:

setting means for setting a run cost value which is a value proportional to a quantity of processor operations required to execute the entirety of the program segment;

compiling means for determining a number of parallel processes to be created for the program segment by dividing the run cost value by an overhead value for executing parallel processing rather than serial processing of the program segment;

creating means for creating the parallel-executable processes for the program segment in accordance with the number of determined parallel processes; and registering means for registering the created parallel processes in a queue;

fetching means for fetching the created parallel processes from the queue and assigning the parallel processes to ones of said plurality of instruction processors; and executing means for executing the parallel processes using the plurality of instruction processors in accordance with the overhead value corresponding to the parallel processing except when the run cost value is substantially equal to the overhead value and serial processes are, therefore, executed.

16. A method for parallel execution of processes in a multiprocessor system having a plurality of instruction processors for converting a source program written in a high-level language into an object module, said method, being executed during execution of an object instruction sequence, comprising the steps of:

determining the number of the parallel processes to be created in accordance with a run cost value set in a run cost field of an execution information area provided as interface information from the object module when the parallel process in a unit of processing a parallel execution section during the execution of the object instruction sequence of the object module becomes executable;

creating the parallel processes in the number determined in the determining step;

calling a parallel run time library containing a plurality of control segments for performing execution control during the parallel execution;

registering the created parallel processes in a queue;

fetching the parallel processes from the queue by utilizing a plurality of scheduling tasks, and assigning the parallel processes to respective ones of said plurality of instruction processors; and executing the parallel processes by utilizing said plurality of instruction processors.

17. A method for executing parallel processes for registering a parallel process in a queue of a parallel run time library during execution of an object module in compiling a program written in a high-level language and converting the program into the object module, wherein converting the program into the object module includes determining whether or not a run time for a parallel-executable object segment is specified in the program, to thereby allow plural process scheduling tasks to fetch the parallel process from the queue, and execute the parallel processing by utilizing a plurality of instruction processors, said method, being executed during execution of an object instruction sequence, comprising the steps of:

providing a run cost field as interface information between the object module and the run time library in an execution information area of the object module, said run cost field being provided for containing a run cost value for the parallel process; and translating, in a compiler, the high-level language into a machine language and executing the parallel processes, said step of translating comprising the steps of:

setting a value of a run cost value of the parallel process in the run cost field when the run cost value thereof is specified in the program, computing an operation quantity of, regarding the run cost value, a parallel process segment on the basis of a count of corresponding intermediate words within the compiler and a count of repetitions of the program, when the run time for the parallel process is not specified in the program, creating an intermediate code to calculate the operation quantity of a parallel process segment based on a formula and store the calculated result of the operation quantity in the run cost field when the operation quantity of the parallel process segment is not established by said computing step, and when the operation quantity of the parallel process segment is established at the time of compiling, setting the computed operation quantity in a corresponding run cost field, determining a maximum number of parallel processes to be created on the basis of a run cost of the run cost field during execution of the process, and determining the number of the parallel processes to be created for dividing repetitions of a loop for computing the loop of the program.

* * * * *